United States Patent [19]

Parnell et al.

[11] Patent Number: 4,928,256
[45] Date of Patent: May 22, 1990

[54] DIGITIZER FOR POSITION SENSING

[75] Inventors: James A. Parnell; Dan R. Poole, both of Austin, Tex.

[73] Assignee: Ametek, Inc., New York, N.Y.

[21] Appl. No.: 168,984

[22] Filed: Mar. 16, 1988

[51] Int. Cl.[5] .......................... G08C 21/00; G01B 7/14; G01B 7/30
[52] U.S. Cl. ...................... 364/561; 178/19; 364/559; 364/560
[58] Field of Search ................ 178/18, 19, 20; 364/559, 560, 561, 562, 570

[56] References Cited

U.S. PATENT DOCUMENTS

| | | | |
|---|---|---|---|
| 3,609,319 | 9/1971 | Clifford et al. | 364/520 |
| 3,732,369 | 5/1973 | Cotter | 178/18 |
| 3,801,733 | 4/1974 | Knight | 178/19 |
| 3,873,770 | 3/1975 | Ioannou | 178/18 |
| 3,904,822 | 9/1975 | Kamm et al. | 178/19 |
| 4,054,746 | 10/1977 | Kamm | 178/19 |
| 4,080,515 | 3/1978 | Anderson | 178/19 |
| 4,185,165 | 1/1980 | Fencl | 178/19 |
| 4,206,314 | 6/1980 | Prugh et al. | 178/19 |
| 4,210,775 | 7/1980 | Rodgers et al. | 178/19 |
| 4,213,005 | 7/1980 | Cameron | 178/18 |
| 4,243,843 | 1/1981 | Rocheleau | 178/19 |
| 4,260,852 | 4/1981 | Fencl | 178/19 |
| 4,368,351 | 1/1983 | Zimmer | 178/19 |
| 4,368,352 | 1/1983 | Davis | 178/19 |
| 4,423,286 | 12/1983 | Bergeron | 178/19 |
| 4,473,717 | 9/1984 | Parnell et al. | 178/19 |
| 4,482,784 | 11/1984 | Whetstone | 178/19 |
| 4,542,328 | 9/1985 | Pouyet | 318/573 |
| 4,554,409 | 11/1985 | Mitsui et al. | 178/19 |
| 4,568,799 | 2/1986 | Kobayashi et al. | 178/18 |
| 4,694,124 | 9/1987 | Blesser | 178/19 |
| 4,705,919 | 11/1987 | Dhawan | 178/19 |
| 4,758,690 | 7/1988 | Kimura | 178/19 |
| 4,788,385 | 11/1988 | Kimura | 178/19 |
| 4,794,209 | 12/1988 | Asada et al. | 178/19 |
| 4,798,920 | 1/1989 | Makino et al. | 178/19 |

Primary Examiner—Felix D. Gruber
Attorney, Agent, or Firm—Amster, Rothstein & Ebenstein

[57] ABSTRACT

Apparatus and method for determining position, tilt and offset of a pointer with respect to a grid of parallel conductors with which it is coupled by obtaining measured responses between each of a group conductors and the pointer and fitting an expression for the response to said measured responses.

40 Claims, 9 Drawing Sheets

DIGITIZER FOR POSITION SENSING

BACKGROUND OF THE INVENTION

Digitizers are used to provide signals respectively representing the rectilinear coordinates of the position of a pointer as it is moved over a planar pad having two grids of parallel insulated conductors mounted thereon in such manner that the conductors of one grid are perpendicular to the conductors of the other. The signals can be used for a number of purposes including the control of the position of a spot of light known as a cursor on the screen of a cathode ray tube. The signals can also be recorded as the pointer traces the line of a drawing, thereby making it possible to reproduce the drawings on a computer aided drawing instrument. Electrical interaction between the pointer and the conductors of one grid is used to provide the signal for the position of the pointer along a coordinate perpendicular to the conductors of that grid, and electrical interaction between the pointer and the conductors of the other grid is used to provide the signal for the position of the pointer along a coordinate that is perpendicular to those conductors.

Two modes of operation are used. In one, electrical stimuli are applied to the pointer and the responses of a grid of conductors provides the data from which a coordinate signal is derived, and in the other, electrical stimuli are applied to the conductors and the responses of the pointer provide the data from which a coordinate signal is derived. In either case, the response characteristic, which is a plot of the responses associated with conductors on either side of the pointer, will be the same.

Most of the digitizers determine the position of the pointer along a rid of conductors by obtaining the response for successive conductors and noting when the response passes through a transition such as a change in phase or a change from a positive amplitude to a negative amplitude. Only the conductors on either side of the transition have significant effect so that the signals representing the coordinate position of the pointer are subject to noise.

Another disadvantage of prior digitizers is that their control systems can only operate with a pointer-grid conductor combination having a given response characteristic, thereby limiting the design of the pointer and grid conductor that can be used.

BRIEF SUMMARY OF THE INVENTION

This invention permits more than two conductors to provide significant data from which the position of a pointer can be calculated with greater accuracy, and, as will be seen, the procedures can be adapted to operate with the response characteristic of different pointer-grid combinations whether they are magnetically or capacitively coupled. Furthermore, the tilt of a stylus can be taken into account.

In a response characteristic the physical positions of conductors on either side of the pointer are along the abcissa, and the respective responses for the conductors are plotted along the ordinate. In accordance with the invention a selected group of conductors is identified that have responses within a given portion of the response characteristic, and an expression is provided that represents the response of each conductor of the group as a function of the distance, $C_2$, between a given point in the group and the pointer. The expression can reflect the gain of the system, any tilt that m resulting from the expression to be respectively equal or nearly equal to the measured responses. The pointer will be at a distance of $C_2$ from the given point in the group.

Whereas any group of conductors could be used, it is preferable from signal to noise considerations to use a group corresponding to a portion of the response characteristic having maximum amplitude in order to obtain the best signal to noise ratio and having a maximum slope to attain the most sensitivity. Thus the group of conductors will usually be centered on the pointer.

Whereas from a theoretical point of view the expression could precisely define the shape of the portion of the characteristic referred to as a function of $C_2$, it would be ,so complicated and have such high powers of $C_2$ that the calculations required to fit it to measured responses would take too long to permit following the pointer when it is moving at reasonable speeds.

For this reason, the expression is made up of sets or equations that respectively approximate the shapes of the sections of the responses for each conductor of the selected group as a function of $C_2$. One set of equations represents the effect of gain on the response. Another set represents the effect of tilt on the response, and both sets may include terms related to the effect of offset on the response. Parabolic equations appear to be the simplest, but other equations could be used. The coefficients for the terms of such equations will be respectively different and can be made to represent any portion of the response characteristic. If a pointer-conductor combination is to be used having a different characteristic, it is only necessary to change the coefficients.

For reasons to be explained, the system has a given pull-in range, i.e. the distance $C_2$ between the group of conductors and the pointer has a maximum value. Therefore, the position of the pointer is approximately predicted, e.g. by a Kalman filter, and responses are attained from an identified group of conductors that are within the pull-in range of the predicted position. When the expression is fit to these responses, the value of $C_2$ provides the precise position of the pointer.

The initial position of the group of conductors can be located by any technique such as noting a change in the responses as the responses for successive conductors are attained, but since the programming for the above fitting method is available, it is preferable to use it. In this case, successive groups of conductors, such as those numbered 1,2,3,4,5,6 and 2,3,4,5,6,7 are scanned until a fit is found. This is done for both grids. When the fit is found for a grid, the precise position of the pointer is known for that grid, but by the time all of the groups of conductors have been scanned for both grids, the pointer may have moved. .Therefore, this is the coarse portion of the pointer.

DETAILED DESCRIPTION OF THE INVENTION

Figure 1:
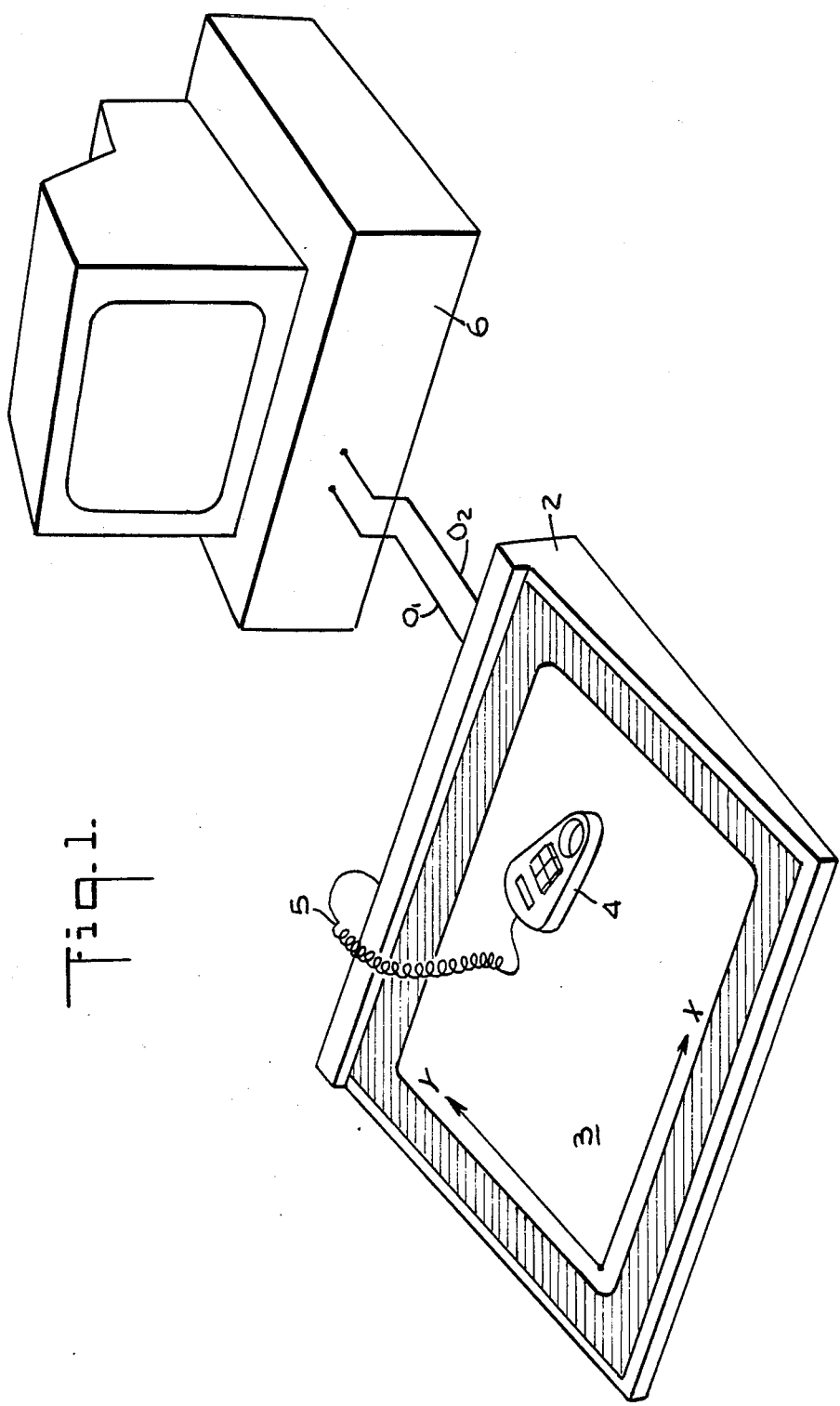
FIG. 1 shows a pad of a digitizer, a pointer mounted thereon and a cathode ray tube display device.

FIG. 1 illustrates a tablet 2 having a planar pad 3. A puck 4 is coupled by wires 5 to circuits contained within the tablet that produce the respective coordinate signals on output leads $0_1$ and $0_2$ that are connected to a CRT or computer monitor 6. The grids of conductors are not shown. They would be affixed to the pad 2 in such manner that its surface would be smooth and thereby permit the puck 4 to be slid over it with little resistance. The conductors used to provide a signal indicating a position along the X coordinate would be perpendicular to the X coordinate, and the conductors used to provide a signal indicating a position along the Y coordinate would be perpendicular to the Y coordinate.

Figure 2A:
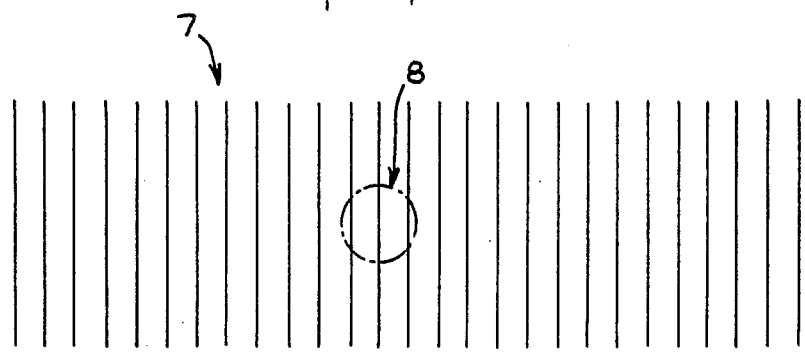
FIG. 2A is a top view of a pick-up coil and a grid of conductors.

FIG. 2A is a top view of a grid of parallel conductors generally indicated by the numeral 7 and of a pickup coil 8 that would be carried by the puck 4 of FIG. The coil 8 could also be wound around a pencil like stylus at some distance from one end.

Figure 2B:
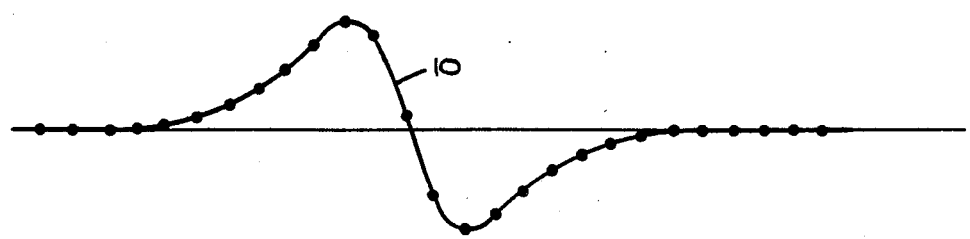
FIG. 2B illustrates a response characteristic for FIG. 2A.

The dots in FIG. 2B on an envelope 10 illustrate responses respectively related to the conductors of FIG. 2A. They can either be the voltage induced in the pickup coil 8 by currents separately passed through the conductors 6, or the voltage induced in the respective conductors by current passed through the pickup coil 8. Note that the envelope 10 has maximum values of opposite sign on opposite sides of the coil 8 and that it passes through zero at its center. Should the pickup coil 8 move in a direction perpendicular to the conductors 6, the characteristic response 10 would move with it.

Figure 3:
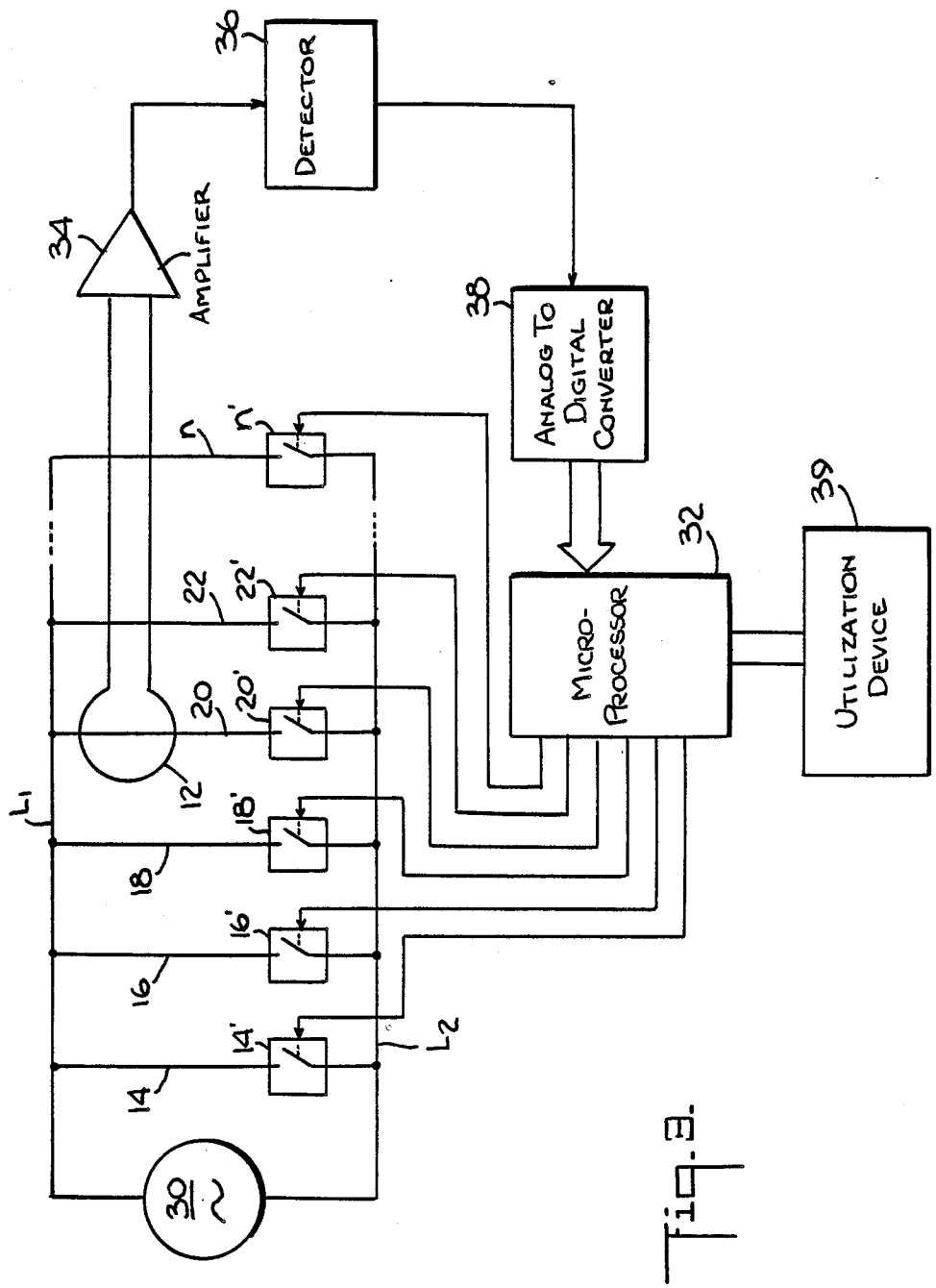
FIG. 3 is a block diagram of a digitizer system.

FIG. 3 is a block diagram of the hardware that may be used in a digitizer employing the position sensing method of this invention. Except for the puck or stylus 12, all components can be contained within the tablet 2 of FIG. 1. In this particular embodiment of the invention, a plurality of conductors 14, 16, 18, 20, 22 to n are respectively connected in series with normally open analog switches 14', 16', 18', 58', and 22' to n' between current supply lines $L_1$, and $L_2$ that are respectively connected to opposite sides of a source 30 of AC current of carefully controlled amplitude. Unipolar pulses of current could also be used.

A microprocessor 32 momentarily closes the switches of successive groups of the conductors 14-n in sequence, i.e. 14, 15, 16–15, 16, 17. etc. The current thus permitted to flow through each conductor induces a voltage in the pickup coil 12 that is coupled to an amplifier 34. Its output is detected by a rectifier 36, and the output of the rectifier is supplied to an analog to digital converter 38 that provides the information to the microprocessor 32 required for carrying out this invention. In this particular embodiment of the invention, currents are passed through the conductors 14-n, and the responses are the voltages induced in the pickup coil 12. Although not shown, current could be passed through the pickup coil 12, and the responses could be the voltages induced in each of the conductors 14-n. The X, Y coordinates of the position of the coil 12 are supplied from the microprocessor 32 to a utilization device 39.

The Basic Concept

Figure 4:
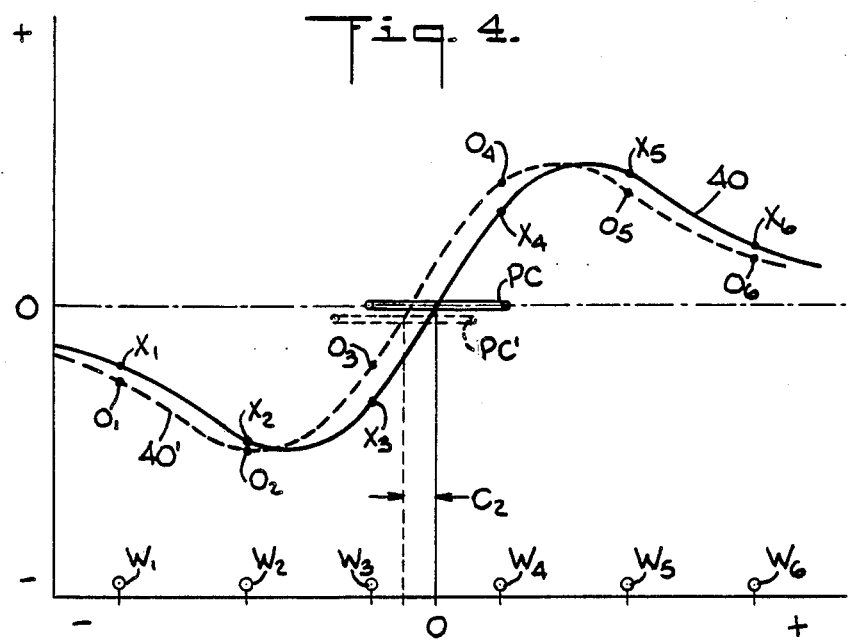
FIG. 4 is a graphical illustration of the movement of the response characteristic used in explaining the operation of the invention.

A solid line 40 in FIG. 4 is a portion of the response characteristic of a magnetic system having a pickup coil PC. The respective responses for a group of conductors $W_1$, $W_2$, $W_3$, $W_4$, $W_5$ and $W_6$ that is centered on the center of the pickup coil PC are respectively indicated at $X_1$, $X_2$, $X_3$, $X_4$, $X_5$ and $X_6$ on the solid curve 40. If the pickup coil PC now moves a distance $C_2$ to the left to the position shown by dashed lines PC', the response curve 40 will move to the dashed line position 40', and the measured responses for the respective conductors would be on the dashed curve 40'as indicated at $0_1$, $0_2$, $0_3$, $0_4$, $0_5$ $0_6$.

Now, if the value of $C_2$ were not known, it could be found from fitting or matching an expression for the expected responses associated with the conductors as a function of $C_2$ to the measured responses $0_1$, $0_2$, $0_3$, $0_4$, $0_5$ and $0_6$.

Although the response characteristic for any given pointer-grid combination will always have the same general shape, its amplitude and therefore the amplitudes of the responses for the group of conductors will vary with the gain of the system, e.g., with the amplitude of the current passed through the conductors on the coil, and it will also vary with the tilt of a stylus. Thus, there are a number of response characteristics depending on various operating factors.

Theory of Operation

In the following discussion, the following symbols will be used.

| | Table of Symbols |
|---|---|
| $Y_i$ | measured amplitude response from exciting $i^{th}$ grid line |
| $x_i$ | location of $i^{th}$ grid line |
| f(x) | amplitude response as a function of distance from exciting grid line |
| g(x) | additional amplitude response due to tilt as a function of distance from exciting grid line |
| $C_1$ | relative gain of amplitude response |
| $C_2$ | relative position of coil to exciting grid lines |
| $C_3$ | offset of amplitude response |
| $C_4$ | relative gain of tilt response |
| $f_i$ | $f(x_i + C_2)$ predicted amplitude response of exciting $i^{th}$ grid line |
| $g_i$ | $g(x_i + C_2)$ predicted tilt response of exciting grid line |

With the pickup coil in the solid line position of FIG. 4, the response $Y_i$ for each of the conductors can be expressed as $$Y_i = C_1 f(x_i) + C_4 g(x_i) + C_3 \tag{1}$$

wherein, as noted in the Table of Symbols, i stands for the $i^{th}$ conductor. The function f is the response when the coil PC is parallel to the plane of the conductors. $C_1$ is the relative gain of this response that is affected by such things as the distance of PC from the plane of the conductors and the overall system gain. $C_4$ is the relative gain of the response due to tilt alone that results from the fact that the coil of a stylus gets closer to the grid conductor when it is tilted. $C_4$ is ignored in the case of a puck because it does not tilt. $C_3$ is a constant offset or addition to the response caused by the magnetic field resulting from current flowing toward and away from the source of current 30 of FIG. 3 via the leads $L_1$ and $L_2$. In order to take into account the change of position of the coil by an amount $C_2$ as noted in FIG. 4, a more general expression for the response is given by the following equation.

$$Y_i = C_1 f(x_i + C_2) + C_4 g(x_i + C_2) + C_3 \qquad (2)$$

Since $Y_i$ can be determined by measurement, the value of $C_2$ could be found if the values of $C_1$, $C_3$ and $C_4$ are known. These values can be found by the least squares method, i.e. by finding values such that the sum of the squared errors, SE, is minimized. The sum SE of the squared errors can be expressed by the following equation.

$$SE = \Sigma [Y_i - C_1 f(x_i = C_2) - C_4 g(x_i + C_2) - C_3]^2 \qquad (3)$$

The minimum of the squared error is found when its partial derivatives with respect to each of $C_1$, $C_2$, $C_3$ and $C_4$ are equal to zero as in the equations below. For the sake of simplification, $f_i = f(X_i + C_2)$ and $g_i = g(X_i + C_2)$ and $f_i'$ and $g_i'$ respectively indicate first derivatives with respect to $C_2$ of $f_i$ and $g_i$.

$$\partial SE / \partial C_1 = 0 => \Sigma[Y_i - C_1 f_i - C_4 g_i - C_3] f_i = 0 \qquad (4)$$

$$\partial SE / \partial C_2 = 0 => \Sigma[Y_i - C_1 f_i - C_4 g_i - C_3](f_i' + g_i') = 0 \qquad (5)$$

$$\partial SE / \partial C_3 = 0 => \Sigma[Y_i - C_1 f_i - C_4 g_i - C_3] = 0 \qquad (6)$$

$$\partial SE / \partial C_4 = 0 => \Sigma[Y_i - C_1 f_i - C_4 g_i - C_3] g_i = 0 \qquad (7)$$

Assumed values of $C_1$, $C_2$, $C_3$ and $C_4$ could be tried until a set of values is found that causes all of the equations (4), (5), (6) and (7) to equal zero, but this would be a long process. Therefore, the following procedure is used.

The equations (4), (6) and (7) are linear in $C_1$, $C_3$ and $C_4$ so they can be rewritten in matrix form as $$\begin{vmatrix} \Sigma f_i^2 & \Sigma f_i g_i & \Sigma f_i \\ \Sigma f_i g_i & \Sigma g_i^2 & \Sigma g_i \\ \Sigma f_i & \Sigma g_i & \Sigma 1 \end{vmatrix} \begin{vmatrix} C_1 \\ C_4 \\ C_3 \end{vmatrix} = \begin{vmatrix} \Sigma y_i f_i \\ \Sigma y_i g_i \\ \Sigma y_i \end{vmatrix} \qquad (8)$$

At a later point more details will be given on a way of processing equation (8) but no solution for $C_1$, $C_3$ and $C_4$ an be found without having a value of $C_2$ because $f_i$ and $g_i$ are expressed in of $C_2$. Therefore, a value for $C_2$ is initially assumed.

It is also necessary to assume functions for $f(x_i + C_2)$ and $g(x_i + C_2)$. Although others may be used, the following parabolic functions indicated by equations (9) and (10) below have been found to work well.

$$f(x_i + C_2) = a_i C_2^2 + b_i C_2 + d_i \qquad (9)$$

$$g(x_i + C_2) = a_{ri} C_2^2 + b_{ri} C_2 + d_{ri} \qquad (10)$$

These equations respectively approximate the way in which the response for each $i^{th}$ conductor such as any of $W_1 - W_6$ will vary about its position on the solid line 40 with the distance $C_2$ between the center of the coil and given point in the group of conductors, e.g. the middle of the group Before any final solution can be reached, the values of the coefficients of (9) and (10) for each $i^{th}$ conductor must be determined by experiments described infra.

When all this is done, equation (8) can be solved for values of $C_1$, $C_3$ and $C_4$ that can be used in equation (5) to obtain a better value of $C_2$ that can be used in equation (8) to obtain better values of $C_1$, $C_3$ and $C_4$, etc. This is an iterative process.

Before describing a way of solving equation (5) for $C_2$ it is rewritten as equation (11).

$$C_1 \Sigma(f_i f_i' + f_i g_i') + C_4 \Sigma(f_i' g_i + g_i g_i') - \Sigma(Y_i - C_3)(f_i' + g_i') = 0 \qquad (11)$$

The values of $C_1$, $C_3$ and $C_4$ derived from the solution of the equation (8) with the assumed value of $C_2$ are substituted in the equation (11), and a value of $C_2$ that is closer to making equation (11) equal zero is found by applying the Newton-Raphson technique described in equation (12) below to equation (11). In equation (12) $C_2^*$ is the new value of $C_2$, $C_2$ is the assumed value on the first pass and h is the function of $C_2$ represented by the left side of equation (11) in which h' is the derivative with respect to $C_2$.

$$C_2^* = C_2 - h(C_2)/h'(C_2) \qquad (12)$$

The value of $C_2^*$ thus obtained is substituted for $C_2$ in equation (8), and the process is repeated.

The value of $C_2 = C_2^*$ attained by this method is subject to error because the equations (9) and (10) are only approximations, but fortunately the errors due to each are predictable and cyclic. When the pointer passes between two adjacent conductors, e.g. as it goes between W3 and W4 of FIG. 4 the error is indicated in FIG. 5.

Whereas the errors could be avoided by using precise equations instead of the approximate equations (9) and (10), they would be so complex and have such high powers of $C_2$ that it would take too long to make the calculations.

Determining the Cyclic Error

Figure 5:
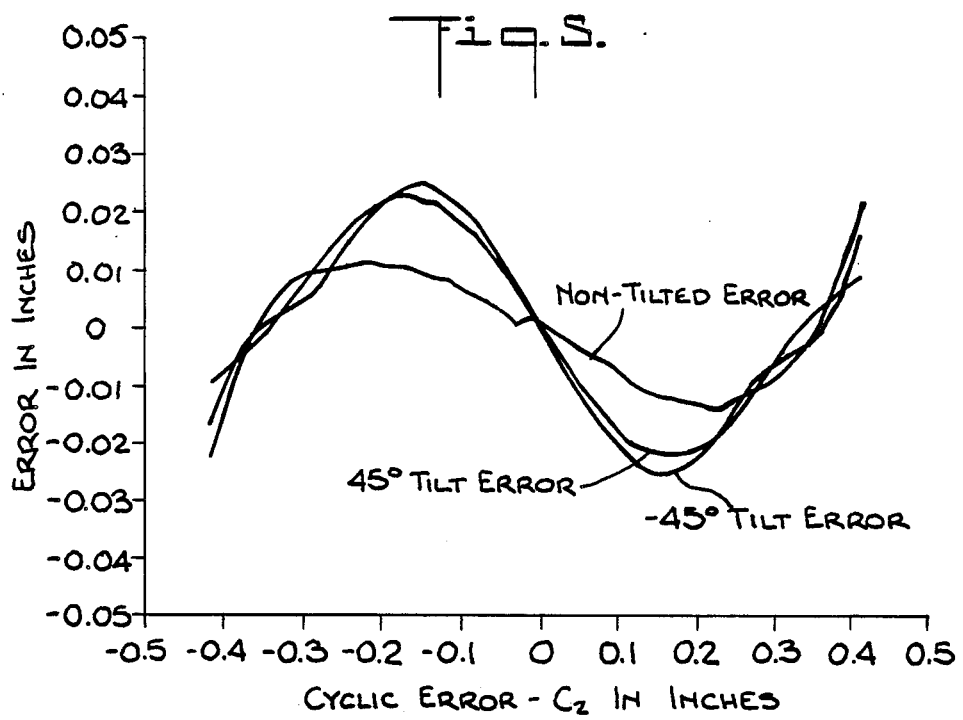
FIG. 5 illustrates cyclic error curves that can be used in making corrections to the calculated position of the pointer.

In order to determine the non tilt cyclic error illustrated by FIG. 5 that is due to the approximation of equation (9), the pickup coil or other type of pointer is held in a no tilt position and carefully moved in small steps corresponding to the desired resolution of $C_2$ from one conductor to the next. The differences between the actual values of $C_2$ and the values of $C_2$ calculated by the system are the errors. They can be stored in a ROM and used to make corrections.

In order to determine the cyclic error illustrated by FIG. 5 that is due to the approximation of the equation (10) that is present only when the pointer is a stylus, a stylus is moved between adjacent conductors in small steps of $C_2$ with its axis at an angle of $+45°$ to the grid plane and in a plane that is perpendicular to the conductors. The differences between the actual values of $C_2$ at each step and the values calculated by the system for each step are recorded in a ROM and used to make corrections when the tilt is +45°. Similar values are stored in a ROM for a tilt of −45°. The cyclic corrections for non tilt or the appropriate correction for tilt, if tilt is present, is used to correct the values of $C_2$ calculated by the system. As will be explained, the value of $C_4$ will determine the amount of the correction to be used, and the sign of $C_4$ will determine whether the +45° correction is to be used or whether the −45° correction is to be used.

Determination of Coefficients For Equation (9)

As previously pointed out, the responses for a group of conductors is approximated by a combination of parabolas respectively representing the section of the selected portion of the response characteristic for each conductor. In this embodiment, the centers of the parabolas are respectively at points $X_1$–$X_6$ in the particular solid line response 40 of FIG. 4 and extend on either side thereof by the expected variation in $C_2$. Since $C_2$ can be greater than the spacing between conductors, there will be some overlap between adjacent parabolas.

The amplitude of the response $Y_{ij}$ for each conductor of the group is measured by physically stepping the coil by increments $C_{2j}$ that may be as small as 0.02 inches over the range of $C_2$ for the parabola for each conductor. The least squares method is then used to fit the parabola for each section to its responses. The sums of the squares of the errors for each conductor wherein $Y_{ij}=f(x_2+C_2)$ are given by $$SE = \Sigma_j (Y_{ij} - a_i C_{2j}^2 - b_i C_{2j} - d_i)^2 \tag{9'}$$

The partial derivative of SE with respect to each of $a_i$, $b_i$ and $d_i$ is derived and respectively set equal to zero so as to provide three simultaneous equations expressed by the following matrix equation (9″) that can be solved for $a_i$, $b_i$ and $d_i$. All sums are for all values of j.

$$\begin{vmatrix} \Sigma 1 & \Sigma c_{2j} & \Sigma c_{2j}^2 \\ \Sigma c_{2j} & \Sigma c_{2j}^2 & \Sigma c_{2j}^3 \\ \Sigma c_{2j}^2 & \Sigma c_{2j}^3 & \Sigma c_{2j}^4 \end{vmatrix} \begin{vmatrix} a_i \\ b_i \\ d_i \end{vmatrix} = \begin{vmatrix} \Sigma y_{ij} \\ \Sigma c_{2j} y_{ij} \\ \Sigma c_{2j}^2 y_{ij} \end{vmatrix} \tag{9''}$$

The values to be used in this equation are illustrated by the following example where the first position is at the conductor so that $C_{2j}=0$.

| Response | 1 | 2 | 3 |
|---|---|---|---|
| Position | 0 | 1 | 2 |

In this example, $\Sigma C_{2j} = 3$ and $\Sigma C_{2j}^2 Y_{ij}$ = the sum of $0^2 \cdot 1 + 1^2 \cdot 2 + 2^2 \cdot 3 = 14$. The value of $\Sigma Y_{ij} = 6$. The equation is then solved by well known determinant procedures for $a_i$, $b_i$ and $d_i$. The same procedure is followed for each conductor of the group.

Determination of Constants for Equation (10)

Figure 6:
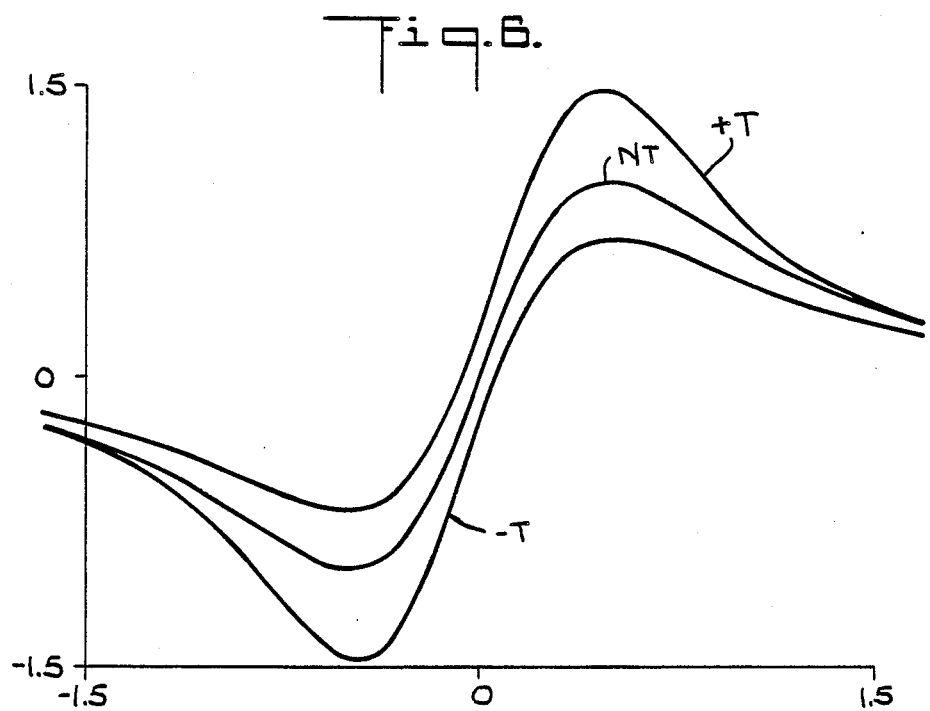
FIG. 6 includes graphs respectively illustrating the response for a nc tilt position, a tilt position of +45° and a tilt position of −45° of the pointer.
Figure 7:
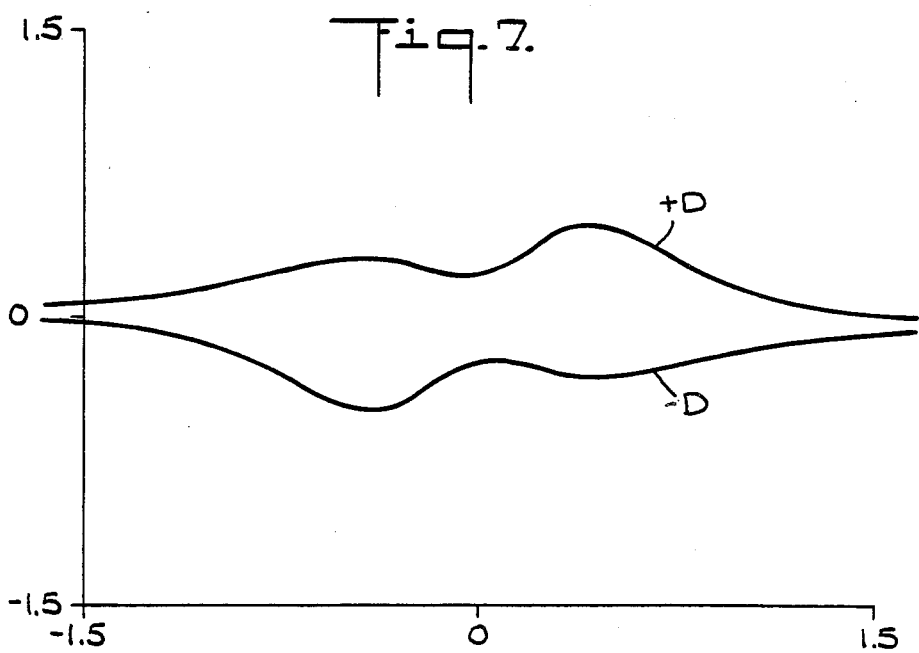
FIG. 7 is a graphical illustration of the difference between the no tilt response of FIG. 6 and each of the tilt responses therein.

Equation (10) represents the effect on the response by tilt alone. Whereas measurements of response can be made for the non tilt situation simply by keeping the axis of the coil perpendicular to the grid plane, no measurements of the response for tilt by itself can be made, but the difference between the response for tilt and the response for non tilt will provide the response for tilt alone. In FIG. 6 a curve NT shows the response for no tilt, a curve +T shows the response for a 45° tilt in one direction and a curve −T shows the response for a 45° tilt in the opposite direction. The tilt referred to occurs when the axis of the coil tilts in a plane that is perpendicular to the conductors. A curve +D in FIG. 7 shows the difference, +T−NT, and a curve −D shows the difference, +T−NT. Therefore, the parabolic expressions of equation (10) for each conductor should have two sets of constants, $a_{ri}$, $b_{ri}$ and $d_{ri}$ so as to respectively approximately match each of the curves +D and −D. The set of constants used depends on which direction the stylus is tilting. Due to the skew symmetry, however, +D would be identical to −D if its polarity were reversed and it is turned end for end so that it is only necessary to determine the constants for one curve. The relationship between the constants is as follows:

$$a_{45\ ri} = -a_{-45\ ri,\ -i}$$

$$b_{45\ ri} = b_{-45\ ri,\ -i}$$

$$d_{45\ ri} = -d_{-45\ ri,\ -i}$$

The constants for each parabolic equation for the tilt situation can be determined in the same manner as the constants for the non tilt case by substituting the differences between the response for the tilt case and the response for the non-tilt case for $Y_i$. The 3×3 matrix is the same as before. By way of example, consider the following.

| Position | 0 | 1 | 2 |
|---|---|---|---|
| Non tilted response | 1 | 2 | 3 |
| Total tilted response | 4 | 6 | 8 |
| Total tilted response minus non tilted response | 3 | 4 | 5 |

In this case, the $\Sigma Y_{ij} = 12$ and $\Sigma C_{2j} Y_{ij} = 0 \times 3 + 1 \times 4 + 2 \times 5 = 14$ and $\Sigma C_{2j}^2 Y_{ij} = 0 \times 3 + 1 \times 4 + 4 \times 5 = 24$.

Solution of Equation 8

$$\text{Let } \lambda = \begin{vmatrix} \Sigma f_i^2 & \Sigma f_i g_i & \Sigma f_i \\ \Sigma f_i g_i & \Sigma g_i^2 & \Sigma g_i \\ \Sigma f_i & \Sigma g_i & \Sigma 1 \end{vmatrix} \tag{13}$$

then $$\begin{vmatrix} C_1 \\ C_4 \\ C_3 \end{vmatrix} = \lambda^{-1} \begin{vmatrix} \Sigma y_i f_i \\ \Sigma y_i g_i \\ \Sigma y_i \end{vmatrix} \tag{14}$$

where $$\lambda^{-1} = 1/ \tag{15}$$

$$\det \lambda \begin{vmatrix} \Sigma 1 \Sigma g_i^2 - (\Sigma g_i)^2 & \Sigma g_i \Sigma f_i - \Sigma 1 \Sigma f_i g_i & \Sigma f_i g_i \Sigma g_i - \Sigma g_i^2 \Sigma f_i \\ \Sigma g_i \Sigma f_i - \Sigma 1 \Sigma f_i g_i & \Sigma 1 \Sigma f_i^2 - (\Sigma f_i)^2 & \Sigma f_i g_i \Sigma f_i - \Sigma f_i^2 \Sigma g_i \\ \Sigma f_i g_i \Sigma g_i - \Sigma g_i^2 \Sigma f_i & \Sigma f_i g_i \Sigma f_i - \Sigma f_i^2 \Sigma g_i & \Sigma f_i^2 \Sigma g_i^2 - (\Sigma f_i g_i)^2 \end{vmatrix}$$

General Operation

The procedures in the flow charts to be described are carried out by the microprocessor 38 of FIG. 3. Before going into details of the various charts, the overall operation indicated by the master flow chart of FIG. 8 will be described. After a block 42 carries out initialization procedures, a block 44 calls for the determination of a coarse X, Y location of the pointer that is performed by the flow chart of FIG. 9. During this procedure a subroutine of FIG. 10 is used.

Figure 8:
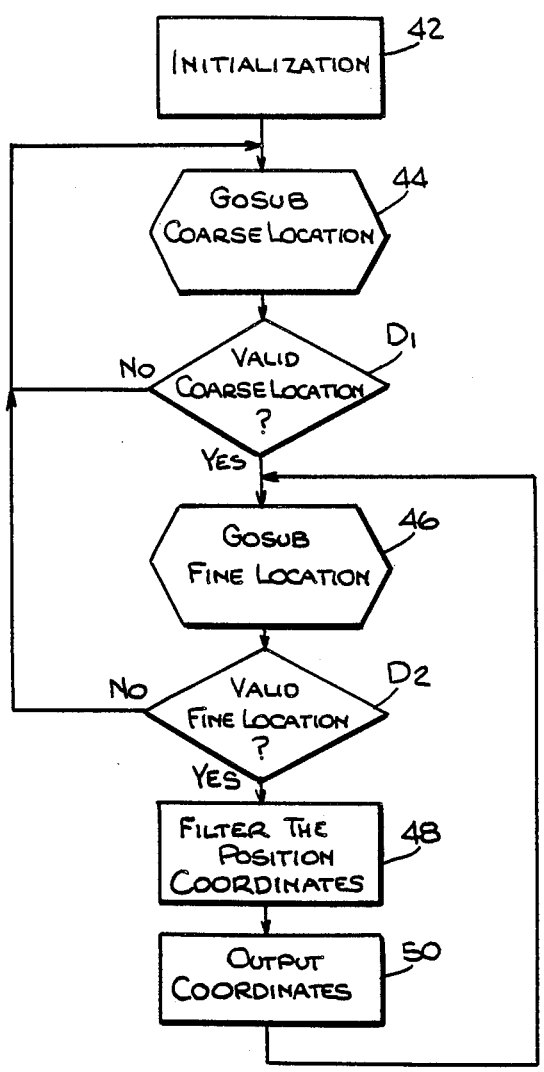
FIG. 8 is a flow chart for master control of the system.
Figure 9:
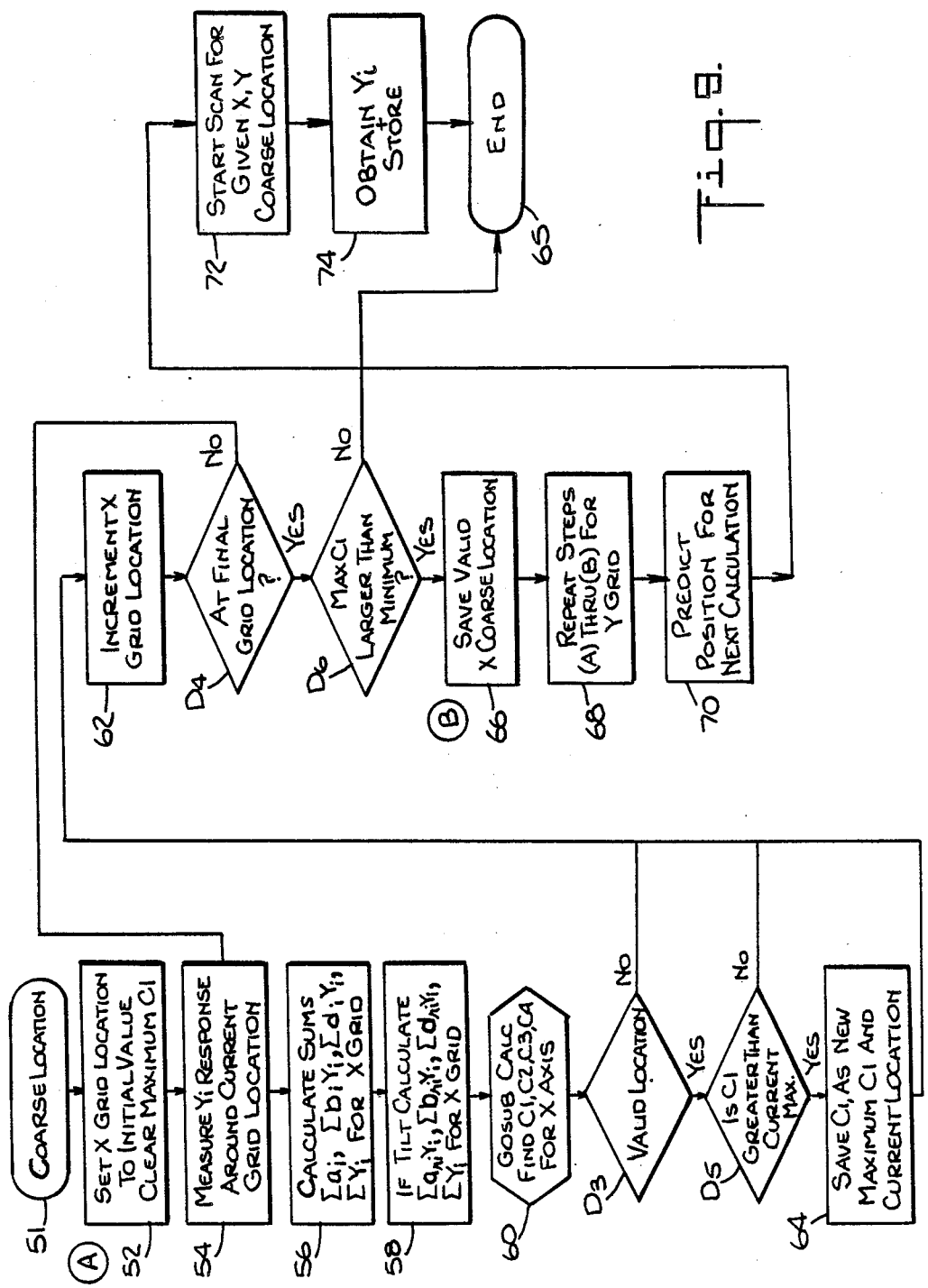
FIG. 9 is a flow chart for determining the initial position of the pointer.
Figure 10:
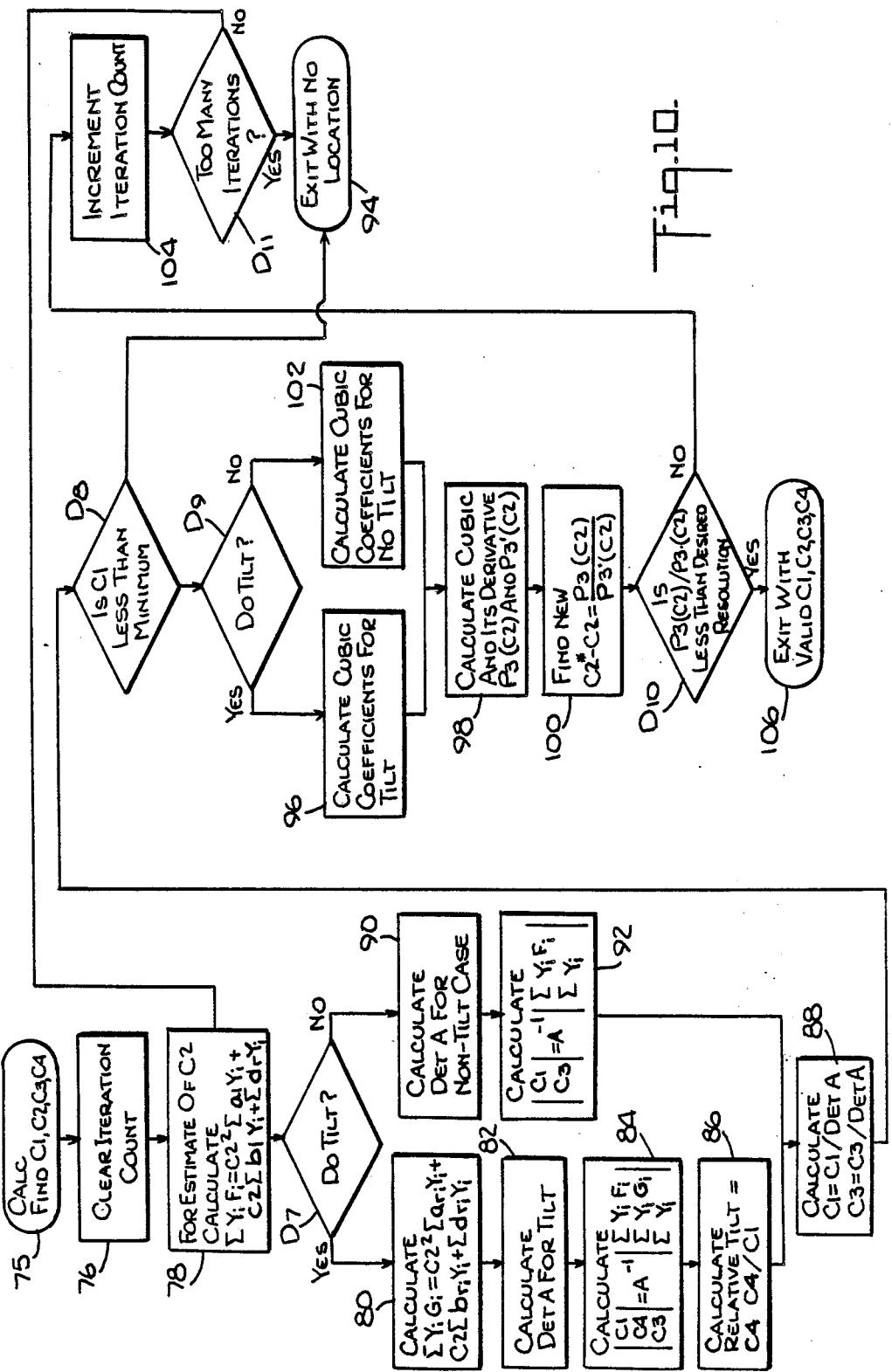
FIG. 10 is a subroutine used in FIGS. 9 and 11.

A decision block D1 of Fig. 8 continually checks the operation of FIG. 9 to see whether or not it has found valid coarse locations for the selected groups of conductors. When a valid coarse location is found, a block 46 initiates the routine of FIG. 11 that calculates the fine or precise location of the pointer on one grid. In performing this function, the subroutine of FIG. 10 that was used in finding the coarse location is used. A decision block D2 monitors the procedure in FIG. 11 to see if it has found a valid fine or precise location of the pointer for both grids. If one has been found, a block 48 filters the valid coordinates so as to reduce the effect of noise, and a block 50 outputs the filtered coordinates. The routine for finding the fine or precise values of coordinates is then reinitiated so as to provide fine positions of the pointer as it moves. Normally, the procedure of FIG. 9 for finding the coarse location is performed only once, and the procedure of FIG. 11 may be performed as often as a few hundred times a second.

Detailed Operation

After the block 44 of the master program of FIG. 8 has called for the determination of a coarse location of the pointer, a block 51 of FIG. 9 initiates the procedure. A block 52 clears a maximum value of $C_1$ that, as will be explained, may have resulted from a previous operation, and selects a group of conductors at one end of the X grid. A block 54 calls for obtaining separate responses for these conductors by scanning them, as, for example, by closing the appropriate switches in FIG. 3 one at a time.

Blocks 56 and 58 then calculate each of the sums indicated therein that are to be used in the subroutine of FIG. 10 to be described that is brought into the procedure by a block 60 for the purpose of calculating the values of C, $C_2$, $C_3$ and $C_4$. A decision block D3 monitors the operation of FIG. 10 to see if it has been able to find a valid value of $C_1$, i.e. a value greater than some arbitrarily selected minimum indicating that the gain of the system is sufficient to have an acceptable signal to noise ratio. If not, the group of conductors being scanned is advanced one conductor by a block 62, and the procedure thus far set forth is repeated unless a decision block D4 indicates that the group of conductors at the other end of the X grid has been reached.

In this embodiment of the invention, the group of conductors that is centered on the pointer is the one selected. These would be conductors $W_1$-$W_6$ of FIG. 4 and will have the greatest value of $C_1$. Therefore, a decision block D5 determines whether the value of $C_1$ for the group of conductors currently being scanned is greater than the maximum value of $C_1$ obtained for previous groups. If not, the procedure goes to the block 62 that advances the group of conductors being scanned, but, if so, the procedure goes to a block 64 that saves the value of $C_1$ and the location of the group of conductors that produced it.

When D4 indicates that the responses for all of the conductors of the grid have been attained, a decision block D6 determines whether or not the maximum value of $C_1$ obtained during the scanning of the grid exceeds the arbitrary minimum value. If not, it means that no valid coarse location of the pointer has been found because the responses are too weak, e.g. the pointer may be too far from the grid, and the procedure terminates at a block 65. If $C_1$ exceeds the minimum value, a block 66 saves the coarse location for the X grid. A block 68 indicates that the steps from A through B should be repeated for the Y grid so as to obtain a valid coarse location for it.

Figure 11:
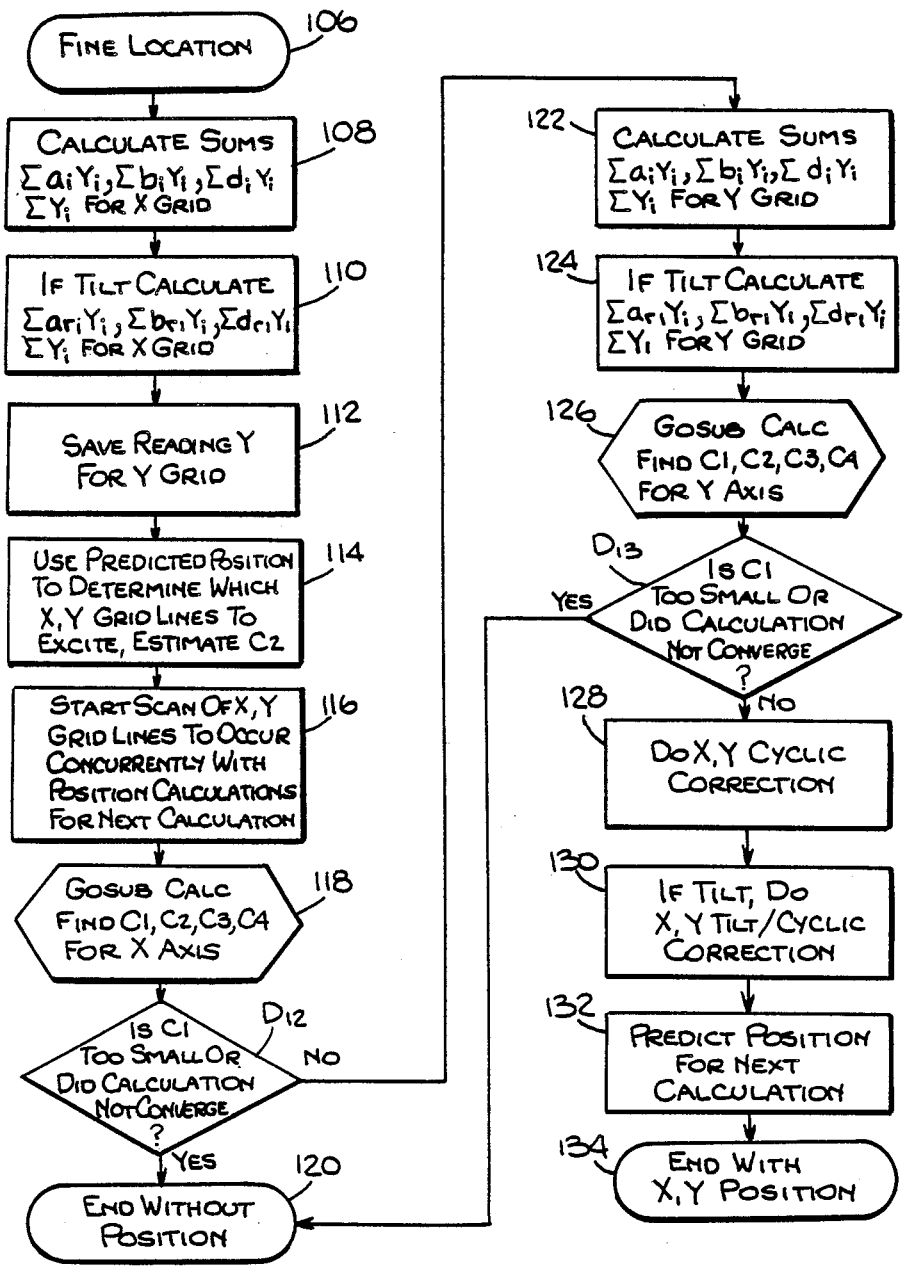
FIG. 11 is flow chart for the calculation of a precise location of the pointer.

In preparation for the determination of the fine or precise position of the pointer by the procedure of FIG. 11, the following steps are taken The X and Y coarse positions are supplied to a block 70 that predicts the next position of the pointer. Since the coarse position is the only one available, it is the position predicted. A block 72 then starts the scan of the group of conductors at the coarse positions just obtained, and a block 74 obtains and stores the measurements $Y_i$. The procedure of FIG. 9 then terminates at the block 65.

The Subroutine of FIG. 10

The procedure in the flow chart of FIG. 10 is a subroutine that calculates the values of $C_1$, $C_2$, $C_3$ and $C_4$ required by the block 60 of FIG. 9. For reasons that will be explained, it is also a subroutine for certain blocks in FIG. 11.

Because, as will be seen, this is an iterative procedure, the number of iterations are counted so that further calculations can be prevented if the number exceeds some arbitrary value based on experience. Therefore, after entry to FIG. 10 at a block 75, a block 76 clears the iteration count.

An estimated value of $C_2$, such as zero, is used for the first calculation by a block 78 in the calculations of $\Sigma Y_i f_i$ that are required for the calculation of equation (8). A decision block D7 indicates whether or not the digitizer has been instructed to take tilt into consideration. If it has, a block 80 makes the calculations for $\Sigma Y_i g_i$ that are also required for the calculation of the equation (8). A block 82 then calculates the determinant of A of the equation (13). A block 84 then makes the calculations for $C_1$, $C_3$, $C_4$ that will be seen from a comparison with equation (15) to omit the division by the determinant of A.

By dividing $C_4$ by $C_1$, a block 86 determines a new value for relative tilt, $C_4$. The reason for the division is to obtain a value for $C_4$ that is not affected by the gain $C_1$ of the system. The new value of $C_4$ is not affected by the fact that block 84 does not divide by the determinant of A. Although not shown, the set of the coefficients $a_{ri}$, $b_{ri}$ and $d_{ri}$ used in the calculations of $\Sigma Y_i g_i$ in the block 80 is assumed to be for a positive or a negative tilt. If the assumption is incorrect, the value of $C_4$ obtained is negative and the other set of coefficients is then used during the next pass through the subroutine. Similarly, the cyclic correction for tilt can be assumed to be for one tilt or the other and changed if $C_4$ is negative.

A block 88 then calculates $C_1$ and $C_3$ by dividing their values as determined by the block 84 by the determinant of A provided by the block 82. This saves time by doing one division rather than the many that would be required by the equation (15)

If, however, the instrument is commanded not to take tilt into account, as, for example, when the pointer is a puck, a block 90 calculates the determinant of A for the non-tilt case in which the middle row and middle column of the equation (13) would be omitted. A block 92 calculates $C_1$ and $C_3$ in the manner indicated so as to omit the division by the latter determinant of A for the non tilt case, and the block 88 makes the division as before so as to obtain the correct values of $C_1$ and $C_3$.

In order to see if the gain of the system is sufficient for reliable results to be obtained, a decision block D8 then determines whether $C_1$ is less than some arbitrary minimum that may be different from the minimum used by D6 of FIG. 9. If it is, the value of $C_2$, which provides the fine position of the pointer with respect to the position of the group of conductors involved, is unreliable, and the procedure terminates at a block 94 with no coarse position having been found.

Should D8 indicate that $C_1$ is not less than the arbitrary minimum, a decision block D9 determines whether or not the digitizer is to take tilt into account. If it is, a block 96 calculates the coefficients of the left side of equation (11). Then a block 98 calculates the value of the left side of equation (11), which is designated as $P3(C_2)$, and its derivative, which is designated as $P3'(C_2)$. The Newton-Raphson technique of the equation (12) can then be carried out for the left side of equation (11) by a block 100 so as to provide a new value of $C_2$ * that may be substituted for the one originally assumed in the next pass through the subroutine.

If D9 indicates that tilt is not to be taken into consideration, the cubic coefficients of the left side of equation (11) that do not have $g_i$ or $g_{ii}$ involved in them are calculated by a block 102. Blocks 98 and 100 then use these coefficients in equation (11) to find a value of $C_2$ that may be used in the next pass through the subroutine.

Whether or not a value of $C_2$ derived by the block 100 is to be substituted for the prior value of $C_2$ during another pass through the subroutine or is to be the final value is determined as follows in either case. A decision block D10 finds whether or not the change in $C_2$, which is $P3(C_2)/P3'(C_2)$, is less than an arbitrary amount. If not, a block 104 increments the count of iterations, i.e. the number of passes through the subroutine, and a decision block D11 determines whether there have been too many iterations. If not, the procedure returns to the block 78 so as to start another pass through the subroutine with the new value of $C_2$. If, on the other hand, the arbitrary number of iterations is exceeded, the procedure terminates at the block 94, and no reliable location has been found.

When D10 indicates that the change in $C_2$ is small enough, the final values of $C_1$, $C_2$, $C_3$ and $C_4$ are provided by block 106.

If this subroutine has been performed for the block 60 of FIG. 9, its procedures continues with D3 in the manner previously described.

Although other procedures for determining the coarse location of the pointer can be used, it is preferable to use the subroutine of FIG. 9 in the manner just described. Furthermore, the subroutine of FIG. 9 is available because it is now used during the procedure of FIG. 11 that determines the fine or precise position of the pointer.

Determination of the Fine or Precise Position of the Pointer

When the decision block D6 of FIG. 9 indicates that the values of $C_1$ resulting from scanning the conductors of both the X and Y grids is in excess of the minimum, the decision block D1 of the master chart of FIG. 8 will indicate that a coarse position of the pointer has been found, and the block 46 of FIG. 8 then calls for the fine or precise position of the pointer to be found by the subroutine of FIG. 11. As previously noted, FIG. 9 prepared for this by scanning the grid conductors of both X and Y grids that are associated with the coarse position by the block 72 and stored the measured value of $Y_i$ resulting from these scans as indicated by the block 74. This second scan of these conductors is required because the pointer may have moved since the first scan when the coarse position was being determined in FIG. 9.

The procedure of FIG. 11 is entered at a block 106. A block 108 calculates the sums $\Sigma a_i Y_i$, $\Sigma b_i Y_i$ and $\Sigma d_i Y_i$ for the X grid with the values of $Y_i$ for each conductor of the scanned group of conductors that were placed in memory by the block 74 of FIG. 9 If tilt is involved, a block 110 derives the sums $\Sigma a_{ri} Y_i$, $\Sigma b_{ri} Y_i$ and $\Sigma d_{ri} Y_i$. These calculations are in preparation for the solution of the equation (8) that will occur when the subroutine of FIG. 10 is called on. A block 112 saves the measured values $Y_i$ for the Y grid.

A block 114 then uses the position of the pointer predicted by the block 70 of FIG. 9 in the X and Y grids to select the respective groups of grid conductors associated with those positions. In this embodiment of the invention, where $C_2$ is measured from the center of a group, the groups will occupy a range including the respective positions of the pointer. The block 114 also supplies estimated values of $C_2$ for the initial solution of the equation (8) for both grids based on the predicted position.

A block 116 then initiates the scans of the selected groups of conductors selected by block 114. During the time required for the analog signals thus derived to pass through the A/D device 38 of FIG. 3 so as to produce the values of $Y_i$ for the selected groups for both grids, the following calculations are performed.

As the values of $Y_i$ emerge from the A/D device 38, they can be stored in the memory previously used by the block 74 because the data originally in them has been used by the blocks 108 and 110, and the block 112 has transferred the data for the Y grid to another memory.

The values derived by the blocks 108 and 110 and the value of $C_2$ provided by the block 114 are used in the subroutine of FIG. 10 now called into operation by a block 118 for the calculation of $C_1$, $C_2$, $C_3$ and $C_4$ for the X grid. $C_2$ is the uncorrected fine or precise position of the pointer with respect to a given point in the selected group of conductors in the X grid. The particular point selected can be the center of a group as in the case of $W_1$–$W_6$ of FIG. 4 so that the pointer is at this point if $C_2=0$.

Before proceeding to a calculation of $C_2$ for the Y grid, a decision block D12 determines whether $C_1$ is too small for the value of $C_2$ to be reliable. If it is, there is no point in calculating $C_2$ for the Y grid, and the procedure terminates at a block 120 without a fine position having been determined.

Should D12 indicate that $C_1$ is not too small, the value of $C_2$ for the X grid is considered to be reliable, and the procedure goes to blocks 122 and 124 that respectively calculate the sums indicated therein that are used in the subroutine of FIG. 10 called on by a block 126 for the iterative calculation that derives the values of $C_1$, $C_2$, $C_3$ and $C_4$ for the Y grid. A decision block D13 makes another examination of $C_1$ to see if it is too small for a reliable value of $C_2$ for the Y grid to be obtained. If so, the procedure terminates the block 120. If not, the value of $C_2$ is the uncorrected fine or precise position of the pointer with respect to the selected group of conductors in the Y grid. While the data from the scans of groups of conductors in the X and Y grids is passing through the A/D converter 38 of FIG. 3, the data from previous scans is being processed.

A block 128 does the cyclic correction for both grids, and if tilt is involved, a block 130 does the cyclic tilt correction for both grids. These corrected positions are used by a block 132 to predict a subsequent position that the pointer will have in both the X and Y grids that will be used by the block 114 in selecting the next groups of conductors to be scanned by the block 116. The X, Y coordinates thus determined at a block 134 are filtered by the block 48 of FIG. 8, and the block 50 of FIG. 8 outputs the coordinates. Thus as previously described, the master program of FIG. 8 causes the procedure of FIG. 11 to be repeated Theoretically, the procedure of FIG. 11 could find values of $C_2$ corresponding to all changes in the position of the pointer, but if the pointer moves too far, the response will become too small for valid values of $C_2$ to be found. The location of the portion of the characteristics used and the number of bits determines what may be called the pull-in range. When the predicted position of the pointer is beyond the pull-in range of a group of conductors in either grid, the block 114 selects a new group that is within the pull-in range of the predicted position. The prediction of the position of the pointer by the blocks 70 of FIG. 9 and 132 of FIG. 11 may be effected by a Kalman filter which carries out the summation below for the X and Y grids separately.

$$P_n = a_1 P_{n-1} + a_2 P_{n-2} + a_3 P_{n-3}$$
$$b_1 M_{n-1} + b_2 M_{n-2} + b_3 M_{n-3} \quad (16)$$

where $P_n$ is the currently predicted position
$P_{n-1}$ is the next previous predicted position etc.
$M_n$ is the current measured position
$M_{n-1}$ is the next previous measured position etc.

The constants $a_n$ and $b_n$ are derived from Kalman filter theory in which the sum of all the coefficients = 1. The following values have been found to work well:

$$a_1 = +1.0286 \quad b_1 = +3.4294$$
$$a_2 = -0.5737 \quad b_2 = -4.9126$$
$$a_3 = +0.1154 \quad b_3 = +1.9129$$

For initialization:

$$P_0 = P_{-1} = P_{-2} = M_{-1} = M_{-2} = M_0 \quad (17)$$

SPECIFICS OF AN EMBODIMENT

The following parameters have worked well in a digitizer in which the conductors are 0.437 inches apart, the shield on the bottom of the pad is 0.128 inches from the grid plane, and the stylus has a coil of 450 turns of 38 AWG solid copper enameled wire with an inside diameter of 0.215 inches and a length of 0.332 inches. The distance between its axial center and the pad is 0.453 inches, and the distance between the top of the pad and the grid is 0.265 inches. The constants $a_i$, $b_i$, $d_i$, $a_{ri}$, $b_{ri}$, $d_{ri}$ for the stylus are:

| | | | | | |
|---|---|---|---|---|---|
| $a_{-3}$ = | −894 | $b_{-3}$ = | 3971 | $d_{-3}$ = | −4303 |
| $a_{-2}$ = | 7520 | $b_{-2}$ = | −1159 | $d_{-2}$ = | −6509 |
| $a_{-1}$ = | 13018 | $b_{-1}$ = | 11477 | $d_{-1}$ = | −4296 |
| $a_1$ = | −13018 | $b_1$ = | 11477 | $d_1$ = | 4296 |
| $a_2$ = | −7520 | $b_2$ = | −1159 | $d_2$ = | 6509 |
| $a_3$ = | 894 | $b_3$ = | −3971 | $d_3$ = | 4303 |
| $a_{r-3}$ = | 274 | $b_{r-3}$ = | 1450 | $d_{r-3}$ = | 1530 |
| $a_{r-2}$ = | −3416 | $b_{r-2}$ = | −48 | $d_{r-2}$ = | 2273 |
| $a_{r-1}$ = | 5545 | $b_{r-1}$ = | −711 | $d_{r-1}$ = | 1147 |
| $a_{r1}$ = | 1180 | $b_{r1}$ = | 6851 | $d_{r1}$ = | 3263 |
| $a_{r2}$ = | −12327 | $b_{r2}$ = | −2921 | $d_{r2}$ = | 5640 |
| $a_{r3}$ = | 4309 | $b_{r3}$ = | 5807 | $d_{r3}$ = | 1672 |

A puck that has been found to work well has eleven turns of 38 AWG solid copper enameled wire having an inside diameter of 1.08 inches and the axial center of the coil is at a distance of 0.085 inches from the surface of the pad which is 0.265 inches from the top of the grid. The constants $a_i$, $b_i$, $d_i$ for the coil are:

| | | | | | |
|---|---|---|---|---|---|
| $a_{-3}$ = | −3681 | $b_{-3}$ = | 7484 | $d_{-3}$ = | 5329 |
| $a_{-2}$ = | 16587 | $b_{-2}$ = | 1985 | $d_{-2}$ = | 9841 |
| $a_{-1}$ = | 14142 | $b_{-1}$ = | 17300 | $d_{-1}$ = | 5590 |
| $a_1$ = | −15896 | $b_1$ = | 16292 | $d_1$ = | 6269 |
| $a_2$ = | −14780 | $b_2$ = | −3023 | $d_2$ = | 9627 |
| $a_3$ = | 3756 | $b_3$ = | −7277 | $d_3$ = | 5041 |

Since a puck cannot tilt, the values of $a_{ri}$, $b_{ri}$ and $d_{ri}$ are not required.

All coefficients are scaled so that 1 unit of $C_2$ equals 0.8303 inches. The amplitude has been scaled so as to prevent overflow in actual calculation. The numeric subscripts are the numbers of the conductors on either side of the center of a group of 6. The cyclic errors are shown on the graph of FIG. 5.

Derivation of Stylus Tilt

If tilt of the stylus is the value of interest, there are eight different cases that can be conceived based on the knowledge or lack of knowledge of the parameters of gain, offset and relative position of the detecting coil. In all cases it is assumed that the value of interest is the relative tilt as defined by $C_4/C_1$. Of course when $C_1$ is known and can be calculated this is equivalent to knowing the relative tilt.

The first case is identical to the one previously described. This occurs when all values $C_1$, $C_2$, $C_3$, $C_4$ are unknown. Equation (18) which is equation (14) with equation (13) substituted therein and the equation (11) rearranged are solved iteratively as previously described. The ratio $C_4/C_1$ is then found as a result.

$$\begin{vmatrix} C_1 \\ C_4 \\ C_3 \end{vmatrix} = \begin{vmatrix} \Sigma f_i^2 & \Sigma f g_i & \Sigma f_i \\ \Sigma f g_i & \Sigma g_i^2 & \Sigma g_i \\ \Sigma f_i & \Sigma g_i & \Sigma 1 \end{vmatrix}^{-1} \begin{vmatrix} \Sigma y_i f \\ \Sigma y g_i \\ \Sigma y_i \end{vmatrix} \quad (18)$$

$$C_1 \Sigma (f_i f' + f g_i') + C_4 \Sigma (f_i' g + g g_i') - \quad (11)$$
$$\Sigma (y_i - C_3)(f_i' + g_i') = 0$$

The second case occurs when the offset, $C_3$, is known and constant. Equations (19), which is derived from equation (18) and equation (20) which is equation (11) rearranged are solved iteratively. If the representations of $f_i$ and $g_i$ account for the offset $C_3$, then $C_3$ can be taken to be zero.

$$\begin{vmatrix} C_1 \\ C_4 \end{vmatrix} = \begin{vmatrix} \Sigma f_i^2 & \Sigma - f g_i \\ \Sigma f g_i & \Sigma g_i^2 \end{vmatrix}^{-1} \begin{vmatrix} \Sigma (Y_i - C_3) f_i \\ \Sigma (Y_i - C_3) g_i \end{vmatrix} \quad (19)$$

-continued $$C_1\Sigma(f_if_i' + f_ig_i') + C_4\Sigma(f_i'g_i + g_ig_i') - \quad (20)$$
$$\Sigma(Y_i - C_3)(f_i' + g_i') = 0$$

In the third case, when $C_1$ is constant and known, the equation (21), which is derived from equation (18), and equation (22), which is a rearrangement of equation (11) are solved iteratively. If the representation of $f_i$ takes into account $C_1$, then it can be taken to be one.

$$\begin{vmatrix} C_4 \\ C_3 \end{vmatrix} = \begin{vmatrix} \Sigma g_i^2 & \Sigma g_i \\ \Sigma g_i & \Sigma 1 \end{vmatrix}^{-1} \begin{vmatrix} \Sigma(Y_i - C_1f_i)g_i \\ \Sigma(Y_i - C_1f_i) \end{vmatrix} \quad (21)$$

$$C_4\Sigma(f_i'g_i + g_ig_i') - \Sigma(y_i - C_1f_i - C_3)(f_i' + g_i') = 0 \quad (22)$$

The fourth case is when $C_1$ and $C_3$ are constant and known. Equation (23), which is derived from equation (18), and equation (24), which is a rearrangement of equation (11) are solved iteratively. As in the previous cases, if the $f_i$ and $g_i$ representations take into account $C_1$ and $C_3$, then they can be taken to be one and zero respectively.

$$C_4 = (\Sigma g_i^2)^{-1} [\Sigma(Y_iC_1f_i - C_3)g_i] \quad (23)$$

$$C_4\Sigma(f_i'g_i + g_ig_i') - \Sigma(Y_i - C_1f_i - C_3)(f_i' + g_i') = 0 \quad (\cong)$$

The fifth through eighth cases occur when $C_2$ is known or determined by an independent procedure. It may not be accurate due to the effect of tilt or offset but can certainly serve as a first approximation from which to obtain tilt values. These can then be used for output or to improve the determined value of $C_2$. This is not unlike the iterative procedure previously described. These cases are identical to the first through fourth cases except that equations (11), (20), (22) and (24) are ignored and the remaining equations (18), (19), (21) and (23) can be solved directly without iteration.

The kind of analysis applied to tilt a described above could be applied similarly to offset and gain if these were desired values so that there are a total of thirty two different possibilities depending on what is desired and what is known or not known.

Whereas the invention has been described as providing the distance $C_2$ between a pointer and a given point in a group of conductors with which it is electrically coupled, it inherently provides information as to the values of $C_1$, $C_3$ and $C_4$ that respectively indicate the amount of gain, offset and tilt that may be used for other purposes. Instead of tilt, and therefore the value of $C_4$, being merely the result of manual movement of a stylus, it can be used as a means for introducing an independent variable. In a computer aided drawing device, for example, the angle of tilt could be purposely varied in accordance with depth or color and the corresponding value of $C_4$ could be used as a measurement thereof. The relationship between the value of $C_4$ and the angle of tilt could be determined by experiment so as to eliminate the effect of cyclic error previously discussed.

In deriving the value of $C_2$, the iterative process is continued until the change in $C_2$ between successive passes through the process is acceptably small. If, however, a measure of tilt is required for other purposes, the iterative process can be continued until the change in $C_4$ between successive passes through the process is acceptably small. This may or may not occur at the same pass that produced an acceptable value of $C_2$ because the convergence for $C_4$ may be different from the convergence for $C_2$. A similar procedure can be followed so as to derive a value of $C_3$. Where $C_3$ is usually a constant value depending on design, it would be possible to vary it in accordance with another independent variable.

We claim:

1. A method for determining the positional coordinates of a pointer movable relative to a planar pad having spaced conductors arranged along orthogonal axes thereof, said spaced conductors and pointer being energized to produce responses which form a response curve dependent upon the distance between said pointer and said energized spaced conductors, said method comprising the steps of:
   (a) storing information functionally related to the characteristic shape of said response curve;
   (b) measuring said responses produced when said pointer is at an unknown positional coordinate relative to said planar pad; and
   (c) mathematically fitting said measured responses to a functional expression which represents said characteristics shape of said response curve to determine said positional coordinates of said pointer.

2. The method of claim 1 wherein said mathematical fitting is performed by a least-squares technique.

3. The method of claim 1 where in said functional expression is a polynomial.

4. The method of claim 3 wherein said polynomial is partially determined by measuring said response at a plurality of predetermined positional coordinates to obtain a plurality of calibration values and fitting said plurality of calibration values to said polynomial to derive therefrom values for the coefficients of s aid polynomial which represent said characteristics shape of said response curve.

5. A method for determining the positional coordinates of a pointer movable relative to a planar pad having spaced conductors arranged along orthogonal axes thereof, said spaced conductors and pointer being energized to produce responses which form a response curve dependent upon the distance between said pointer and said energized spaced conductors, said method, for each axis comprising the steps of:
   (a) measuring said responses at a plurality of predetermined positional coordinates to obtain a plurality of calibration values;
   (b) mathematically fitting said plurality of calibration values to a polynomial to obtain therefrom a plurality of polynomial coefficients for said polynomial which define a polynomial response function representing said characteristic shape of said response curve;
   (c) measuring responses produced when said pointer is at an unknown positional coordinate relative to said planar pad; and
   (d) mathematically fitting said measured responses to said polynomial response function to determine therefrom said unknown positional coordinate of said pointer.

6. The method of claim 5 wherein said polynomial response function is represented by a series of quadratic expressions, each member of said series representing a portion of said polynomial response function.

7. The method of claim 5 wherein said mathematical fitting is performed by a least-squares technique.

8. The method of claim 5 wherein said polynomial response function, for each axis, as a function of the position $x_i$ of each of said spaced conductors is expressed as a function $$Y_i = C_1 f(x_i + C_2) + C_4 g(x_i + C_2) + C_3$$

where $f(x)$ is an amplitude term having a gain coefficient $C_1$, $g(x)$ is a tilt term having a tilt coefficient $C_4$, $C_2$ is the distance along said planar pad from said pointer to the nearest of said spaced conductors and $C_3$ represents an offset term.

9. The method of claim 8 wherein segments of $f(x)$ and $g(x)$ are approximated by a series of parabolas to represent said characteristic shape of said response curve.

10. The method of claim 9 wherein said series of parabolas are mathematically fitted to said plurality of calibration values by a least-squares technique to obtain polynomial coefficients thereof which determine said polynomial response function.

11. The method of claim 8 wherein said measured responses are fitted to said function by a least-squares technique which minimizes the squared differences between said measured response and said function with respect to $C_1$, $C_2$, $C_3$ and $C_4$ to thereby obtain values of $C_1$, $C_2$, $C_3$ and $C_4$, determining therefrom the positional coordinate of said pointer by combining the value of $C_2$ so obtained with a previously determined coordinate of said spaced conductor which is nearest said pointer.

12. The method of claim 9 wherein said measured responses are fitted to a series of parabolas which approximate different segments of said function by minimizing the squared differences between said measured responses and said series of parabolas with respect to $C_1$, $C_2$, $C_3$ and $C_4$ to obtain values of $C_1$, $C_2$, $C_3$ and $C_4$, determining therefrom the positional coordinate of said pointer by combining the values of $C_2$ so obtained with a previously determined coordinate of said spaced conductor which is nearest said pointer.

13. A method for making an initial coarse determination of the position of a pointer relative to a planar pad having spaced conductors arranged along orthogonal axes thereof, said spaced conductors and pointer being energized to produce responses which form a response curve dependent upon the distance between said pointer and said energized spaced conductors, said method, for each axis, comprising the steps of:

(a) selecting a group of said spaced conductors located at one edge of said grid;

(b) measuring the responses for each conductor of said group;

(c) mathematically fitting the measured responses to a functional expression of the form $$Y_i = C_1 f(x_i + C_2) + C_4 g(x_i + C_2) + C_3$$

which represents the response $Y_i$ for a conductor at coordinate $x_i$, where $f(x)$ is an amplitude term having a gain coefficient $C_1$, $g(x)$ is a tilt term having a tilt coefficient $C_4$, $C_2$ is the distance along said planar pad from said pointer to the nearest of said spaced conductors, and $C_3$ represents an offset term, said fitting being performed by a least-squares technique to determine the values of $C_1$, $C_2$, $C_3$ and $C_4$ which fit said measured responses for said group;

(d) storing the value of $C_1$ and the location of said group of conductors;

(e) successively selecting next groups of conductors each spatially offset from the previously selected group of conductors by one conductor spacing and determining and storing for each of said next groups the value of $C_1$ and the location of said group in accordance with the above steps (b), (c) and (d), for each of said successively selected groups of conductors comparing the value of $C_1$ to the previously stored value of $C_1$, retaining the greater of the two values of $C_1$ and the corresponding location of said group of conductors associated with said greater value until all the conductors along said axis have been so selected to determine therefrom which of said group of conductors corresponds to a maximum value of $C_1$; and (f) determining the coordinate of said conductor nearest said pointer from the location of said group of conductors corresponding to said maximum value of $C_1$, which coordinate defines the coarse location of said pointer along each of said axes.

14. A method for determining the fine position of a pointer movable relative to a planar pad having sets of spaced conductors arranged along orthogonal axes thereof, said fine position being the distance along said planar pad of said pointer from a conductor previously determined to be nearest said pointer, said spaced conductor and pointer being energized to produce responses which form a response curve dependent upon the distance between said pointer and said energized spaced conductors, said method, for each axis, comprising the steps of:

(a) selecting a group of said spaced conductors including said conductor nearest said pointer;

(b) measuring the responses for each conductor of said group;

(c) mathematically fitting the measured responses to a function of the form $$Y_i = C_1 f(x_i + C_2) + C_4 g(x_i + C_2) + C_3$$

which represents the response $Y_i$ for a conductor at coordinate $x_i$, where $f(x)$ is an amplitude term having a gain coefficient $C_1$, $g(x)$ is a tilt term having a tilt coefficient $C_4$, $C_2$ is said fine position, and $C_3$ represents an offset term, said fitting being performed by a least-squares technique to determine values of $C_1$, $C_2$, $C_3$ and $C_4$ which fit said measured responses for said group, said value of $C_2$ determined therefrom corresponding to the fine position of said pointer along each of said axes.

15. The method in accordance with claim 14, including the further step of combining said fine position with a previously determined coarse position of said pointer corresponding to the coordinate of said conductor nearest said pointer to obtain the positional coordinate of said pointer.

16. The method in accordance with claim 15, wherein the coarse determination of the position of said pointer at successive locations of said pointer is calculated from a knowledge of its previous trajectory and velocity by using a predictor algorithm.

17. The method of claim 16 wherein said predictor algorithm is based on Kalman filter techniques.

18. An apparatus comprising:

(a) a planner pad having spaced conductors arranged along orthogonal axes thereof to form a grid;
(b) a pointer capable of being moved along said planar pad;
(c) energizing means to produce responses dependent upon the distance between said pointer and said energized spaced conductors which form a response curve; and
(d) a control system including a microprocessor having means for controlling said energizing means and means for determining the positional coordinates of said pointer along each axis as it is moved relative to said planar pad, by the steps of:
  (i) storing information functionally related to the characteristic shape of said response curve;
  (ii) measuring the responses produced when said pointer is at unknown positional coordinate; and
  (iii) mathematically fitting said measured response to a functional expression which represents said characteristic shape of said response curve to determine therefrom said unknown positional coordinate of said pointer.

19. The apparatus in accordance with claim 18, wherein said microprocessor performs said mathematical fitting by a least-squares technique.

20. The apparatus in accordance with claim 18, wherein said microprocessor acquires and stores coefficients which express said characteristic shape of said response curve as a polynomial.

21. The apparatus in accordance with claim 20, wherein said microprocessor stores information functionally related to the characteristic shape of said response curve by measuring said responses at a plurality of predetermined positions of said pointer to obtain a plurality of calibration values which are then mathematically fit to said polynomial to derive therefrom values for polynomial coefficients which represent said characteristic shape of said response curve.

22. An apparatus comprising:
(a) a planner pad having spaced conductors arranged along orthogonal axes thereof;
(b) a pointer capable of being moved relative to said planar pad;
(c) energizing means to produce responses which form a response curve dependent upon the distance between said pointer and said spaced conductors; and
(d) a control system including a microprocessor having means for controlling said energizing means, and means for determining positional coordinates of said pointer along each axis as it is moved relative to said planar pad by the steps of:
  (i) measuring said responses at a plurality of predetermined positional coordinates to obtain a plurality of calibration values which are stored therein;
  (ii) mathematically fitting said plurality of calibration values to a polynomial to obtain therefrom a plurality of polynomial coefficients which are stored therein to define the characteristic shape of said response curve;
  (iii) measuring said responses corresponding to an unknown positional coordinate of said pointer along said axis; and
  (iv) mathematically fitting said measured responses to said polynomial to obtain therefrom said positional coordinate of said pointer along said axis.

23. The apparatus in accordance with claim 22 wherein said polynomial is represented by a series of quadratic expressions, said microprocessor storing information to mathematically fit each member of said series to a portion of the characteristic shape of said response curve.

24. The apparatus in accordance with claim 22 wherein said microprocessor stores information to perform said mathematical fitting by a least-squares technique.

25. The apparatus in accordance with claim 22 wherein said microprocessor stores information which expresses said characteristic shape of said response curve for each axis as a function of the position $x_i$ of each of said spaced conductors by a function $$Y_i = C_1 f(x_i + C_2) + C_4 g(x_i + C_2) + C_3,$$

where $f(x)$ is an amplitude term having a gain coefficient $C_1$, $g(x)$ is a tilt term having a tilt coefficient $C_4$, $C_2$ is the distance along said planar pad from said pointer to the nearest of said spaced conductors and $C_3$ represents an offset term.

26. The apparatus in accordance with claim 25 wherein said microprocessor stores information to represent segments of $f(x)$ and $g(x)$ by parabolas.

27. The apparatus in accordance with claim 26 wherein said microprocessor stores information to mathematically fit said series of parabolas to said plurality of calibration values by a least-squares technique to obtain said stored polynomial coefficients which represent the characteristic shape of said response curve.

28. The apparatus in accordance with claim 25 wherein said microprocessor stores information to fit said measured responses to said function by a least-squares technique which minimizes the squared differences between said measured responses and said function with respect to $C_1$, $C_2$, $C_3$ and $C_4$ to obtain values of $C_1$, $C_2$, $C_3$ and $C_4$, determining therefrom the positional coordinate of said pointer by combining the value of $C_2$ so obtained with a previously determined coordinate corresponding to said spaced conductor which is nearest said pointer.

29. The apparatus in accordance with claim 26 wherein said microprocessor stores information to fit said measured responses to a series of parabolas which approximate different segments of said function by minimizing the squared differences between said measured responses and said series of parabolas with respect to $C_1$, $C_2$, $C_3$ and $C_4$ to obtain values of $C_1$, $C_2$, $C_3$ and $C_4$, determining therefrom the positional coordinate of said pointer by combining the value of $C_2$ so obtained with a previously determined coordinate of said spaced conductor which is nearest said pointer.

30. An apparatus comprising
(a) a planner pad having spaced conductors arranged along orthogonal axes thereof;
(b) a pointer capable of being moved relative to said planar pad;
(c) energizing means to produce responses which form a response curve dependent upon the distance between said pointer and said spaced conductors; and
(d) a control system including a microprocessor having means for controlling said energizing means and means for determining an initial coarse position along each axis when said pointer if first placed onto said planar pad by the steps of:

(i) selecting a group of said spaced conductors located at one edge of said grid;
(ii) measuring the responses for each conductor of said group;
(iii) fitting the measured responses to a function of the form $$Y_i = C_1 f(x_i + C_2) + C_4 g(x_i + C_2) + C_3$$

representing the response $Y_i$ for a conductor at coordinate $x_i$, where $f(x)$ is an amplitude term having a gain coefficient $C_1$, $g(x)$ is a tilt term having a tilt coefficient $C_4$, $C_2$ the distance along said planar pad from said pointer to the nearest of said spaced conductors, and $C_3$ represents an offset term, said fitting being performed by a least-squares technique to determine the values of $C_1$, $C_2$, $C_3$ and $C_4$ which fit said measured responses for said group;

(iv) storing the value of $C_1$ and the location of said group of conductors;

(v) successively selecting next groups of conductors each spatially offset from the previously selected group of conductors by one conductor spacing and determining and storing for each of said next groups the value of $C_1$ and the location of the group in accordance with the above steps (ii) (iii), and (iv) for each of said successively selected groups of conductors comparing the value of $C_1$ to the previously stored value of $C_1$, retaining the greater of these two values of $C_1$ and the corresponding location of said group of conductors associated with said greater value until all the conductors along said axis have been so selected to determine therefrom which of said group of conductors corresponds to a maximum value of $C_1$;

(vi) determining the coordinate of said conductor nearest said pointer from the location of said group of conductors corresponding to said maximum value of $C_1$, which coordinate defines the coarse location of said pointer.

31. An apparatus comprising:
(a) a planar pad having spaced conductors arranged along orthogonal axes thereof;
(b) a pointer capable of being moved along said planar pad;
(c) energizing means to produce responses which form a response curve dependent upon the distance between said pointer and said spaced conductors; and
(d) a control system including a microprocessor having means for controlling said energizing means and means for determining the distance of said pointer from a conductor previously determined to be nearest said pointer by performing, for each axis, the steps of:
(i) selecting a group of said spaced conductors including said conductor nearest said pointer;
(ii) measuring the responses for each conductor of said group;

(iii) mathematically fitting the measured responses to a function of the form $$Y_i = C_1 f(x_i + C_2) + C_4 g(x_i + C_2) + C_3$$

which represents the response $Y_i$ for a conductor at coordinate $x_i$, where $f(x)$ is an amplitude term for said pointer having a gain coefficient $C_1$, $g(x)$ is a tilt term having a tilt coefficient $C_4$, $C_2$ is the distance from said pointer to said nearest of said spaced conductors and $C_3$ represents an offset term, said fitting being performed by a least-squares technique to determine values of $C_1$, $C_2$, $C_3$ and $C_4$ which fit said measured responses for said group, said value of $C_2$ determined thereby corresponding to the distance of said pointer from said nearest conductor.

32. The apparatus in accordance with claim 31 wherein said microprocessor is further instructed to combine said value of $C_2$ with a previous coarse determination of the position of said pointer to obtain the positional coordinate of said pointer.

33. The apparatus in accordance with claim 32 wherein said microprocessor stores information to calculate a coarse position of said pointer as it is moved to successive locations from a knowledge of its previous trajectory and velocity by utilizing a predictor algorithm.

34. The apparatus of claim 33 wherein said predictor algorithm is based on Kalman filter techniques.

35. A method for determining the tilt angle of a pointer positioned on and movable over a planar pad having spaced conductors arranged along orthogonal axes thereof, said spaced conductors and pointer being energized to produce responses which form a response curve dependent upon the tilt angle and distance between said pointer and said energized spaced conductors, said method comprising the steps of:
(a) storing information functionally related to the characteristic shape of said response curve;
(b) measuring responses produced when said pointer is at an unknown position and tilt angle relative to said planar pad; and
(c) mathematically fitting said measured responses to a functional expression which represents said characteristic shape of said response curve to determine therefrom said tilt angle and position of said pointer.

36. The method in accordance with claim 35 wherein said functional expression is a polynomial expression determined by measuring said responses at a known tilt angle for a plurality of predetermined positional coordinates to obtain a plurality of calibration values, said plurality of calibration values being mathematically fitted to said polynomial expression to derive therefrom values for the coefficients of said polynomial expression which represent said characteristic shape of said response curve.

37. The method in accordance with claim 35 wherein said functional expression is $$Y_i = C_1 f(x_i + C_2) + C_4 g(x_i + C_2) + C_3$$

where $f(x)$ is an amplitude term having a gain coefficient $C_1$, $g(x)$ is a tilt-dependent term having a tilt coefficient $C_4$ whose value depends on the tilt angle, $x_i$ is the positional coordinate of each of said spaced conductors, $C_2$ is the distance along said planar pad from said pointer to the nearest of said spaced conductors and $C_3$ represents an offset term.

38. The method in accordance with claim 37, wherein said measured responses are fitted to said functional expression by minimizing the squared differences between said measured responses and said functional expression with respect to $C_1$, $C_2$, $C_3$ and $C_4$, determining thereby a value of $C_2$ which corresponds to said position of said pointer and a value of $C_4$ which corresponds to the tilt angle at said position of said pointer.

39. A method for determining the positional coordinate and tilt angle of a pointer movable relative to a planar pad having spaced conductors arranged along orthogonal axes thereof, said spaced conductors and pointer being energized to produce responses which form a response curve dependent upon the tilt angle and distance between said pointer and said energized spaced conductors, said method comprising the steps of:
  (a) storing information functionally related to the characteristic shape of said response curve;
  (b) measuring responses produced when said pointer is at an unknown positional coordinate and tilt angle relative to said planar pad;
  (c) mathematically fitting said measured responses to a functional expression which includes parameters representing said positional coordinate and tilt angle to determine therefrom values for said parameters.

40. An apparatus comprising:
  (a) a planar pad having spaced conductors arranged along orthogonal axes thereof;
  (b) a pointer movable relative to said planar pad;
  (c) energizing means to produce responses which form a response curve dependent upon the tilt angle and distance between said pointer and said spaced conductors; and
  (d) a control system including a microprocessor having means for controlling said energizing means, and means for determining said positional coordinate and tilt angle of said pointer, for each axis as it is moved along said planar pad, by the steps of:
    (i) storing information functionally related to the characteristic shape of said response curve;
    (ii) measuring responses produced when said pointer is at an unknown positional coordinate and tilt angle relative to said planar pad;
    (iii) mathematically fitting said measured responses to a functional expression which includes parameters representing said positional coordinate and tilt angle to determine therefrom values for said parameters.

* * * * *